Patented Jan. 19, 1937

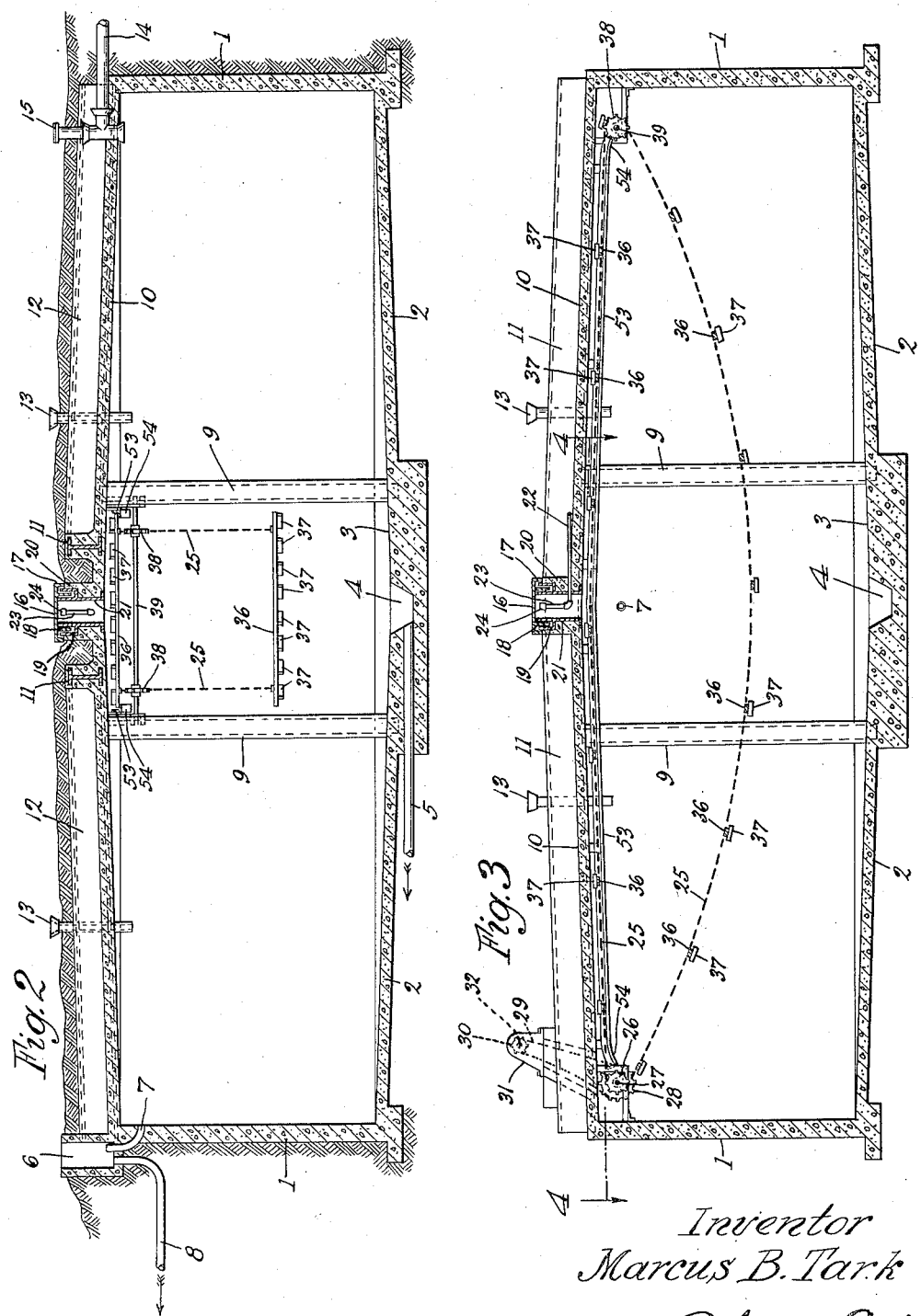

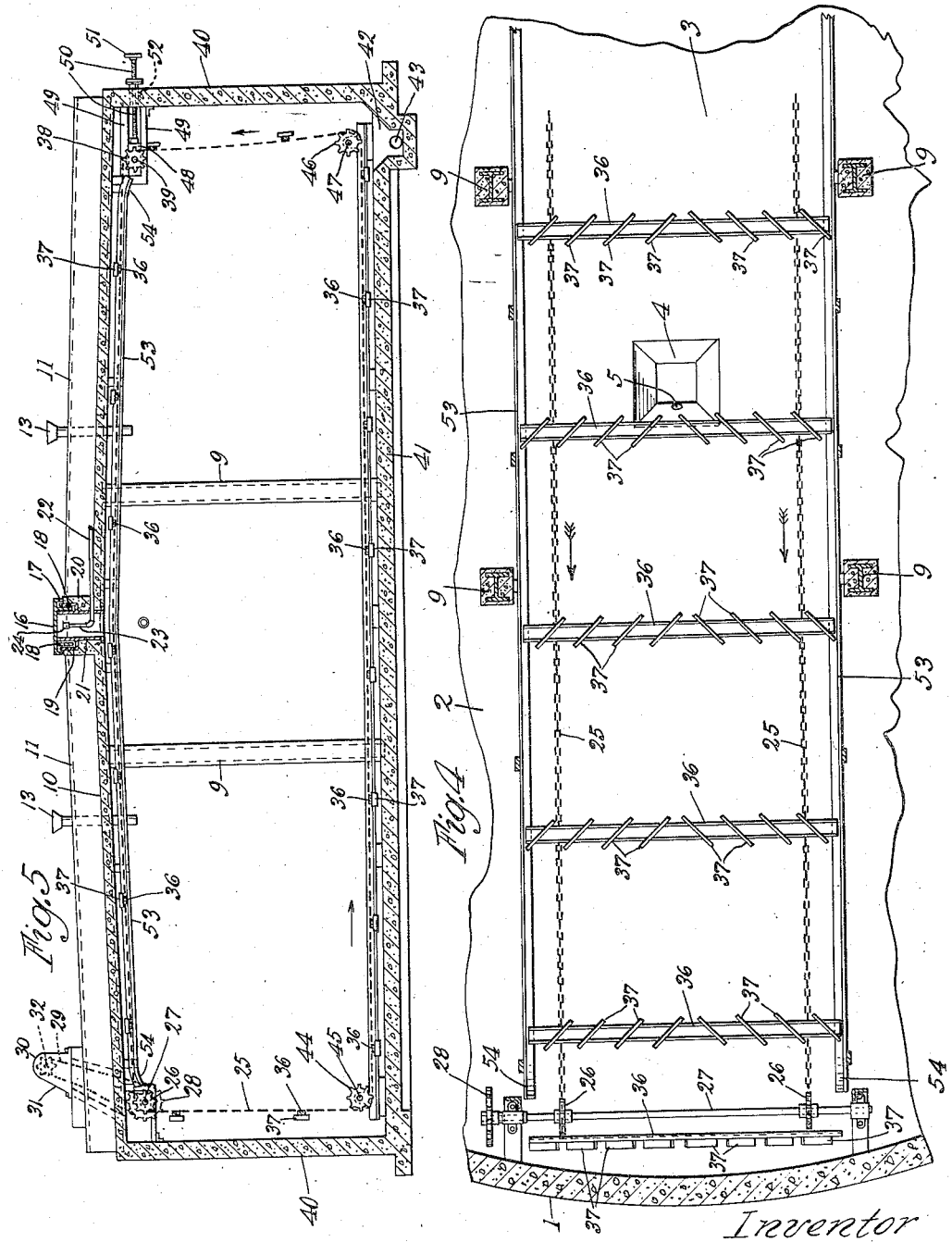

2,068,521

UNITED STATES PATENT OFFICE 2,068,521

SCUM PADDLING DEVICE FOR SLUDGE DIGESTION TANKS

Marcus B. Tark, Philadelphia, Pa., assignor to Link-Belt Company, Chicago, Ill., a corporation of Illinois Application June 13, 1935, Serial No. 26,362

12 Claims. (Cl. 210—3)

This invention relates to an apparatus and a process for moving and breaking scum from the surface or upper portion of the fluid within a tank. In the particular form here shown it is applied to a sludge digestion tank and has for one object to provide means for preventing the accumulation of scum at or near the upper surface of the sludge and for removing the scum in case any has accumulated.

Another object of the invention is to provide means for collecting the digested sludge and for bringing it to a point of discharge, normally in the bottom of the tank.

Another object of the invention is to provide a scum or sludge removing means, or both, so designed that they permit the installation of columns in the tank as roof supports and thereby permit the installation of a lighter roof than would otherwise be possible if the sludge or scum handling mechanism were such as to prevent the installation of columns within the tank.

Other objects will appear from time to time in the specification and claims.

The invention is illustrated more or less diagrammatically in the accompanying drawings, wherein:—

Figure 2 is a transverse vertical section taken at line 2—2 of Figure 1;

Figure 3 is a transverse vertical section, taken at line 3—3 of Figure 1;

Figure 4 is a generally horizontal sectional detail taken at line 4—4 of Figure 3 on an enlarged scale;

Figure 5 is a view generally similar to Figure 3, showing a modified form of sludge handling mechanism and a modified form of tank.

Like parts are designated by like characters throughout the specification and drawings.

Figure 1:
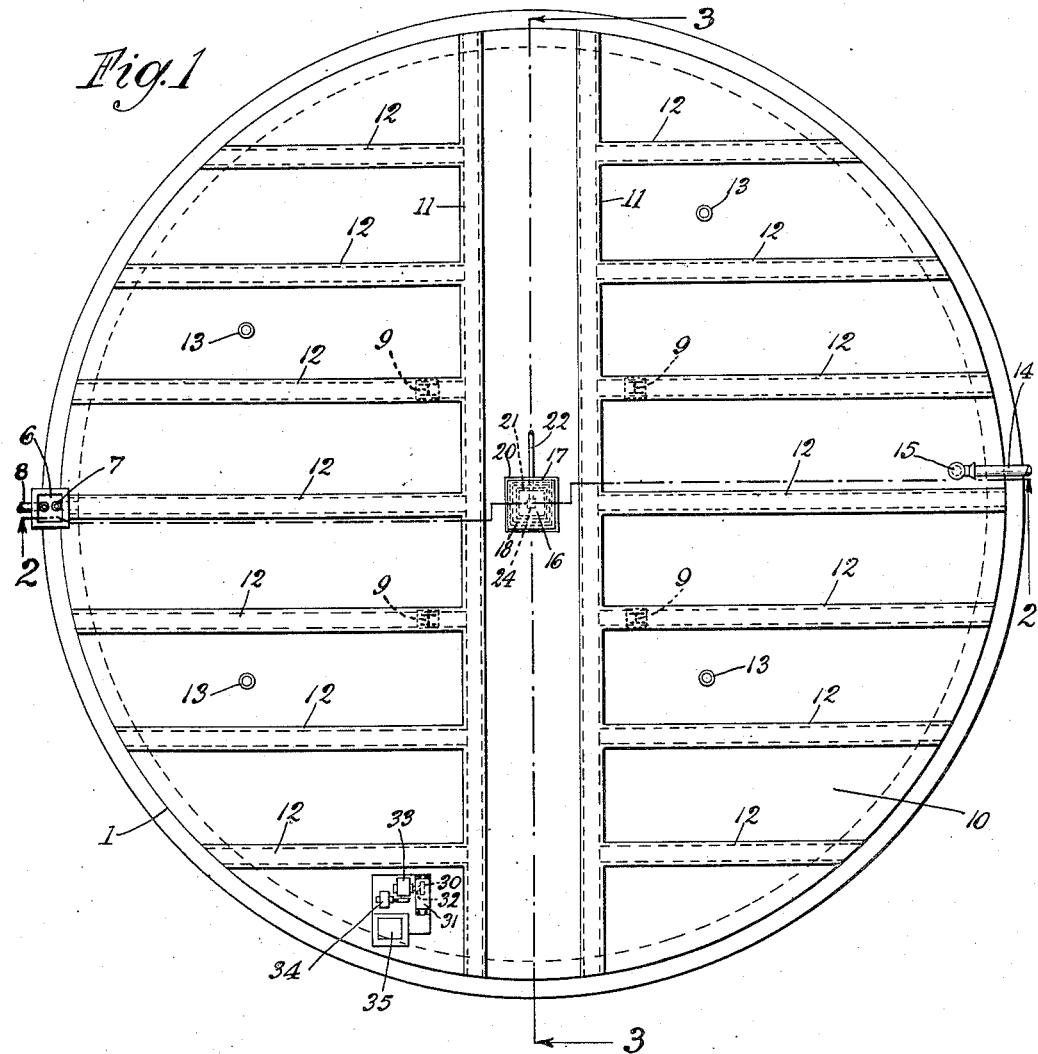
Figure 1 is a plan view of the exterior of the tank with the cover or roof in place.

The mechanism of this invention may be installed in tanks of almost any shape. As here shown it is installed in a round tank which is covered, but neither the cover nor the shape of the tank are essential features of the invention, which might be installed in an uncovered tank of any suitable shape.

As here shown there is a tank having side walls 1, a bottom wall or floor 2, which may, along a part of its area, be inclined as at 3 to provide a generally transverse channel within which is positioned a sludge collecting hopper 4, preferably located centrally of the tank. A discharge pipe 5 leads from the hopper 4 and through it settled and collected sludge is discharged or withdrawn.

Adjacent the upper portion of the tank near one edge is an overflow 6 for super-natant liquor. It is connected to the interior of the tank by a curved pipe 7 and is provided with a discharge pipe or outlet 8.

Positioned within the tank are one or more supporting columns 9 and resting upon them is a roof structure 10, which may be slightly raised at its center as shown particularly in Figures 2 and 3, and which may include one or more beams 11 which, in the form shown, extend clear across the tank. Joining these beams and running from them to the side of the tank is a plurality of beams 12.

Formed in the roof are one or more sampling wells or openings 13. As shown these are tubular members extending through the roof and may be provided with any suitable form of cover.

14 is a sludge feed pipe by means of which sludge and liquid and other material are fed to the tank. It may be provided with a sampling well or opening 15, as shown particularly in Figures 1 and 2. 16 is a gas dome provided with downwardly depending peripheral flange 17 and with a longer downwardly depending inner flange 18, which latter fits within a groove or depression 19 formed in the upwardly projecting member 20, which, in the form here shown, is integral with the roof although it might be otherwise made. It is lined by a casing 21 which is open to the interior of the tank. A gas pipe 22 extends into the interior of the casing 21 and is provided with an upwardly extending part 23 which has an opening 24 by means of which gas may be withdrawn from the interior of the tank. The pipe 22 may be connected to any means for withdrawing gas or permitting gas to escape from it.

As shown in Figures 2, 3 and 4 the scum paddler or breaking device comprises a pair of chains 25 which engage sprockets 26 on the shaft 27. At one end the shaft 27 carries a driving sprocket 28 which engages a drive chain 29. At its upper end this chain engages a driving sprocket 30. The chain 29 passes through a suitable opening in the roof structure and is surrounded with a gas-tight housing or enclosure 31 which also surrounds the driving sprocket 30 and the end of the shaft 32, upon which the sprocket is mounted. The shaft 32 extends outside of the gas-tight housing 31 to the reduction gear 33 which may be driven by a motor, 34, or otherwise. A manhole 35, suitably covered, is provided adjacent the driving mechanism just described.

The chains carry a series of cross members 36 which extend between them and are moved by them. Fastened to the cross members 36 are a plurality of blades 37. These are preferably angularly disposed with respect to the path of the chain so that as the chain is moved through the tank the effect of the blades is to cause an agitating and breaking movement of the scum. In one form, as illustrated in Figure 4, the blades on each side of the center of a given cross member are so inclined that as the chain moves in the direction of the arrow shown in that figure material tends to be drawn or moved toward the center of the tank.

In the form of the invention shown in Figures 2 and 3, a pair of idler sprockets 38 are mounted on a shaft 39 which is carried in any suitable bearing or supporting arrangement. Because the return run of the chain is allowed to run free, as shown in this figure, ordinarily no take-up or bearing adjustment is necessary.

Where the chain and the blades which it carries act only as scum paddles and conveyors, the return run of the chain is left free as indicated in Figure 3. Where, however, the lower or return run of the chain is to be used for collecting the sludge, it is necessary to provide means for holding it in proper relation with the floor. This form of the invention is indicated in Figure 5. In that form the roof construction of the tank is generally the same as that above described. The tank may be of any suitable shape. It is provided with side walls 40 and a bottom or floor 41 and a sludge hopper 42, in this case situated adjacent one of the side walls 40 and provided with an outlet and discharge 43.

The driving mechanism is as above described for the other forms of the device, but suitable idler sprockets 44 on a shaft 45 and other idler sprockets 46 on a shaft 47 are provided adjacent the bottom of the tank, located on suitable bearing supports.

Since in this form of the invention the lower run of the chain acts as a conveyor also, it is necessary to provide one of the sprockets with adjustments to permit control of the tension in the chain. It is convenient to provide the upper idler sprockets 38 with an adjustment. In the form shown bearing blocks 48 carry the shaft 39 and are mounted between tracks or guides 49. A threaded control or adjustment shaft 50 is provided with a handle 51 and a correspondingly threaded seat 52. It may be rotated by the handle 51 and thus the bearing blocks 48 are moved in and out as the shaft 50 is moved in and out and the tension of the chains is varied as necessary.

It will be noted that the take-up adjustment just described is located outside of the tank so that this adjustment may be made without the necessity of going into the tank or opening it.

The upper run of the chain in any form of the invention may be supported in guide angles or channels 53. They may be downwardly curved at their outer ends as at 54. It will be understood that any sort of guiding or supporting means may be used if desired and in certain installations they may be found unnecessary.

The use and operation of my invention are as follows:

The apparatus described herein may be used in connection with almost any shape of tank and it is not limited to a circular tank.

In a sludge digestion tank sludge frequently accumulates in the form of a scum on the surface. It is important to break up this sludge to permit it to settle from the surface to the bottom of the tank. The sludge of itself is of sufficient weight to sink but it will often carry entrained gases in sufficient quantities to prevent its sinking. The blades 37, whatever their size, shape, inclination or arrangement, are moved by the chains slowly across the tank and they act as breakers, breaking up the scum, relieving it of entrained gases and allowing it to settle by breaking it into sufficiently small particles to permit the escape from the scum of sufficient gas so that the scum is no longer held up by the gas but is directly submerged or else permitted to sink below the sub-natant liquor and to move toward the bottom of the tank.

The sludge breaker shown extends over only a relatively small proportion of the area of the tank and I have found that it is sufficient to break the sludge over this small area and it is not necessary to have means for contacting the entire area of the sub-natant liquor in the tank. As the breaker is moved across the tank and as it breaks up the scum, causing and permitting it to sink, along the zone directly affected by the breaker, the scum on other parts of the surface moves into the zone of the breaker from which the scum already acted upon has sunk, and this new scum is then contacted by the breaker, it is broken and the entrained gases escape from the scum and the scum sinks. Thus, by a breaker which covers and affects only a small portion of the area of the surface of liquor within the tank, the scum on the entire area is broken.

In one form of the invention the breaker is shown so arranged that its lower run acts as a sludge collecting or conveying means to move sludge to the discharge outlet. In another form of the invention the breaker acts only as a breaker. The breaker may or may not act as a sludge conveyor and may or may not be combined with some other form of sludge conveyor.

By reason of the fact that the scum on the entire surface can be effectively broken by a breaker which extends over only a small portion of the surface, it is unnecessary to provide a breaker covering or effective upon the entire surface. Therefore, since the breaker is required to move across only a portion of the surface, it is not necessary that the entire interior of the tank be left uninterrupted in the manner heretofore believed to be necessary. Thus it is possible to use columns and other supports in the tank for its roof structure and as a result of this larger tanks can be used than heretofore because by the use of columns it is possible to build a roof structure more cheaply than before possible, where the roof structure had to be self-supporting and also it is possible to build roof structures of greater span and hence larger tanks can be built and adequately covered.

As the flights of the scum breaker move across that portion of the tank which they sweep in addition to the effects above described, they have a further effect. The flights of the scum breaker carry before them a certain amount of scum and when these flights go over the wheels at the head shaft, they carry this scum with them and submerge it, thus by this means causing it to sink so that they have not only the breaking effect described above they have an actual physical down dragging or submerging effect on the portion at least of the scum which they contact.

I claim:

1. In combination, a circular digestion tank, mechanical means movable diametrically across a portion of the surface of the liquid within the tank for breaking up floating material to free it from gas and thereby to cause it to sink, such means comprising a plurality of chains and flights positioned between the chains and movable by them said flights positioned to cause scum to move centrally of the tank.

2. In combination, a circular digestion tank, means for breaking up directly the scum within a zone extending diametrically across the surface of the liquid within the tank comprising mechanical means movable diametrically across a diametrical portion of the surface of the liquid within the tank for breaking up floating material to free it from gas and thereby to cause it to sink and shaped to move said scum toward the center of the tank, such means comprising a plurality of chains and flights positioned between the chains and movable by them.

3. In combination, a circular digestion tank, a unitary means for sweeping a limited zone extending diametrically across the surface of the liquid within the tank and for simultaneously setting up a current to move all of the material floating on the surface of the liquid progressively into said zone comprising mechanical means extending over less than the total area of the tank movable across a diametrical portion of the less than the total surface of the liquid within the tank for breaking up floating material to free it from gas and thereby to cause it to sink, such means comprising a plurality of chains and flights positioned between the chains and movable by them.

4. In combination a circular digestion tank, a roof therefor, and a plurality of relatively light, separated columns arranged in parallel rows within the tank separated from its walls, supporting said roof, and means within the tank for breaking up scum over the entire surface of the tank, said means comprising a movable scum breaker positioned adjacent the surface of liquid within the tank between two rows of columns and of such size as to sweep an area less than the total surface of the tank and means for moving the breaker.

5. In combination a circular digestion tank, a roof therefor and columns arranged in parallel rows within the tank separated from its walls and extending from the floor of the tank to said roof to support the same and means extending over a portion of the surface of the liquid only, and located between two rows of columns acting directly upon a portion only of the surface of the liquid within said tank and for simultaneously setting up currents on the upper surface of said liquid to move all of the material floating thereupon into the path of said means, said means comprising a movable scum breaker positioned adjacent the surface of the liquid within the tank and sweeping an area less than the total area of the tank and means for moving it in a generally straight path to break the scum which lies within its path.

6. In combination a circular digestion tank, a roof therefor, and columns arranged in parallel rows within the tank separated from its walls, supporting said roof, and means within the tank for breaking up scum over the entire surface of the tank, said means comprising a movable scum breaker positioned adjacent the surface of liquid within the tank between two rows of columns and of such size as to sweep an area less than the total surface of the tank and means for moving the breaker, a portion of said scum breaking means being arranged to move adjacent the bottom of the tank and to collect material within its path.

7. In combination a circular digestion tank, a roof therefor, and columns arranged in parallel rows within the tank separated from its walls, supporting said roof, and means within the tank for breaking up scum over the entire surface of the tank, said means comprising a combined movable scum breaker and current creating mechanism positioned adjacent the surface of liquid within the tank between two rows of columns and of such size as to sweep an area less than the total surface of the tank and means for moving the breaker, said combined breaker and current creating mechanism carrying blades disposed and shaped to set up a current to move all the floating material progressively into the area swept by said breaker, a portion of said scum breaking means being arranged to move adjacent the bottom of the tank and to collect material within its path.

8. In combination a circular sludge digestion tank, a gas-tight roof, and a scum breaker mounted within the tank, said breaker comprising chains and means for carrying a plurality of pitched blades, columns arranged in parallel rows positioned within the tank and extending from its bottom to said roof to support the same, the sludge breaker positioned to pass between two rows of columns and arranged to act upon a zone of less area than that of the tank, said breaker carrying flights disposed angularly with respect to the main axis of movement of the breaker and positioned to set up converging currents to move progressively all of the material on the surface of the liquid within the tank into its path.

9. In combination with a sludge digestion tank, a gas-tight roof, and a sludge breaker mounted within the tank, said breaker comprising chains and means for carrying a plurality of pitched blades, and a take-up for said chains and means for operating said take-up from a point outside of the tank.

10. In combination, a relatively shallow circular sewage treatment tank having a generally flat roof, a plurality of columns arranged in spaced parallel rows across the tank supporting the roof, scum breaking means movable diametrically across the tank between two rows of columns.

11. The process of treating sewage material which consists in maintaining a mass of sewage in a generally circular detention zone, directly breaking up the scum formed at the top of said zone in a diametrically disposed area extending substantially entirely across the zone and setting up currents adjacent the upper surface of the zone whereby scum located at both sides of the breaking area is brought into and broken in such area.

12. The process of treating sewage material which consists in detaining a mass of sewage in a generally cylindrical detention zone, propelling the surface liquid in the zone along a diametric path extending substantially entirely across the zone, breaking up the scum formed on the surface of the liquid as it travels along said path and as a result of such liquid movement imparting motion to the surface liquid in the zone on both sides of the path to form opposed clockwise and counter-clockwise currents which join the movement of the liquid along the diametric path and convey the scum formed outside such path thereinto and there breaking up the conveyed scum.

MARCUS B. TARK.